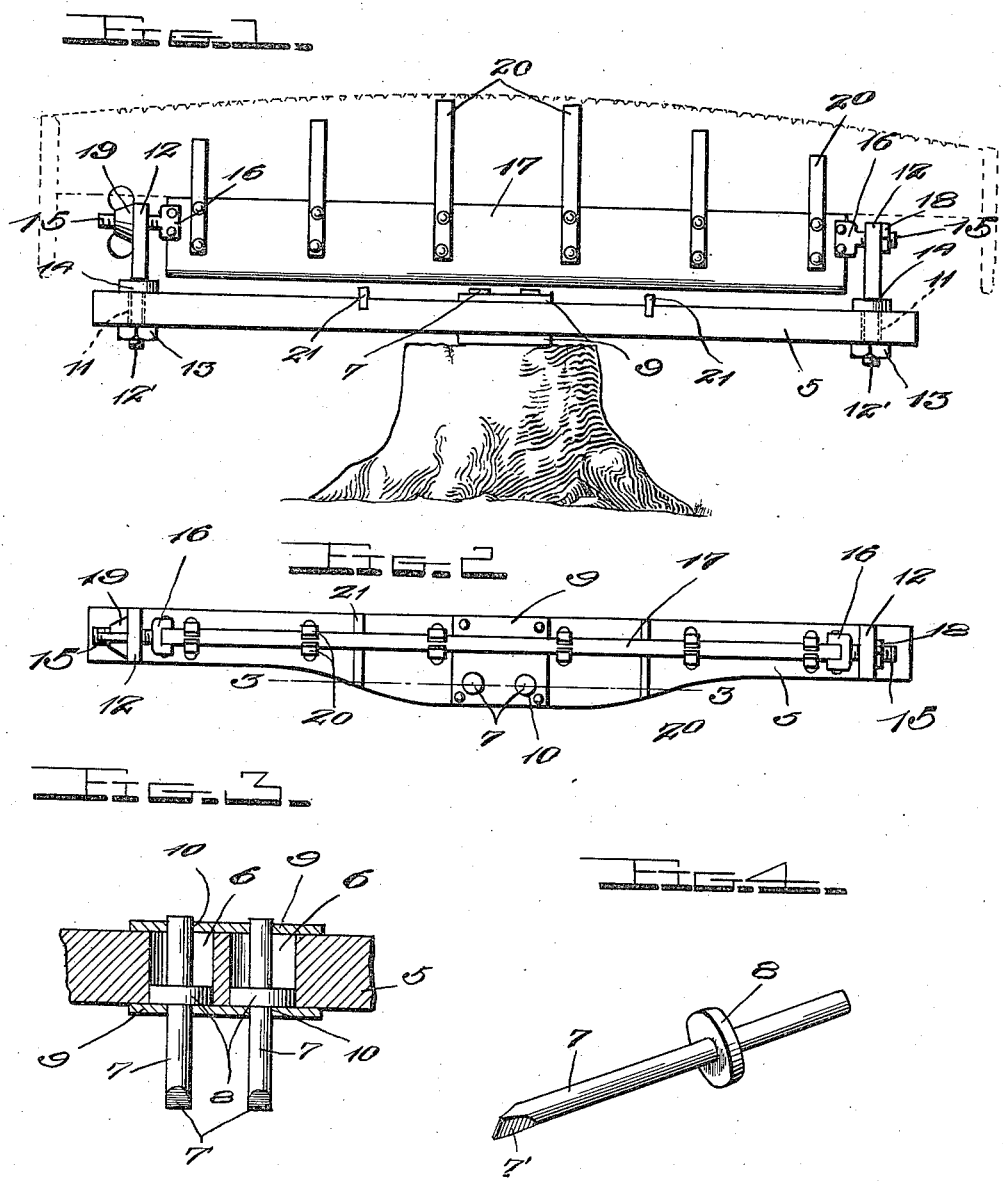

UNITED STATES PATENT OFFICE.

WILLIAM SCHILDERS AND WALTER MURPHY, OF WHITLOW, ARKANSAS.

SAW-VISE.

1,063,292.

Specification of Letters Patent.  Patented June 3, 1913.

Application filed May 1, 1912. Serial No. 694,570.

*To all whom it may concern:*

Be it known that we, WILLIAM SCHILDERS and WALTER MURPHY, citizens of the United States, residing at Whitlow, in the county of Ashley and State of Arkansas, have invented certain new and useful Improvements in Saw-Vises, of which the following is a specification, reference being had to the accompanying drawings.

This invention relates to certain new and useful improvements in saw vises and has for its object to provide a device of this character whereby the saw blade may be readily positioned at any desired angle to facilitate the filing or setting of the teeth.

Another object of the invention resides in the provision of an angularly adjustable saw holding member and means for rigidly securing the same in its adjusted position, a body bar upon which said member is removably mounted, and improved means for mounting said body bar upon a stump or other suitable base.

Still another object of the invention is to provide a saw vise or clamp of comparatively simple construction and which is strong, durable and of great convenience in practical use.

With the above and other objects in view, the invention consists of the novel features of construction, combination and arrangement of parts hereinafter fully described and claimed, and illustrated in the accompanying drawings, in which—

Figure 1 is a side elevation showing our improved saw vise mounted upon a tree stump; Fig. 2 is a top plan view thereof; Fig. 3 is an enlarged detail section taken on the line 3—3 of Fig. 2; and Fig. 4 is a detail perspective view of one of the stump pins.

Referring in detail to the drawing, 5 designates the body bar, the central portion of which is of greater width than the end portions thereof and is provided with spaced openings 6. These openings receive the stump pins 7 which are adapted to be driven into the stump to securely anchor the body bar thereto. The pins 7 are each provided with an intermediate annular shoulder 8 and upon the top and bottom sides of the central portion of the body bar the plates 9 are rigidly secured. These plates are provided with spaced openings 10 which register with the openings in the body bar but are of smaller diameter than said latter openings. The openings 10 of the plates 9 are adapted to receive the stump pins 7, the annular shoulders 8 of said pins providing stops to limit the movement of the pins in the openings of the body bar, said annular shoulders being of greater diameter than the openings in the plates. The lower ends of the stump pins are preferably sharpened as indicated at 7' and are adapted to be driven into the tree stump to rigidly and securely retain the body bar in position thereon.

The opposite ends of the body bar 5 are provided with openings 11 to receive the lower reduced ends 12' of the bearing standards 12. These reduced lower end portions of the standards are cylindrically formed and provided with screw threads to receive the securing nuts 13 and upon the reduced lower end of the standards and on the upper surface of said body bar suitable washers 14 are adapted to be disposed. The upper end portions of the standards 12 are provided with openings to receive the bearing trunnions 15 formed upon the U-shaped members 16, said members being securely riveted to the opposite ends of the saw holding bar 17. One of the bearing trunnions 15 has a nut 18 threaded thereon for binding engagement against the standard while upon the other of said bearing trunnions a wing nut 19 is threaded and is adapted to engage the other of the standards to rigidly and securely hold the saw supporting bar 17 in its adjusted position between the standards.

The bar 17 is provided at spaced intervals and upon each of its faces with the spring clamping plates 20 which are adapted to engage upon opposite sides of the saw blade and securely clamp the same in position on said bar, the back edge of the blade resting upon the longitudinal edge of the supporting bar 17.

In the upper surface of the body bar 5 upon opposite sides of the central portion thereof the transversely disposed ribs 21 are mounted, said body bar being provided with grooves in which the ribs are seated. In the use of the device, when it is desired to set the teeth of the saw, the washers 14 upon the lower cylindrical end portions of the bearing standards 12 are removed. The nuts 13 are then adjusted upon the lower ends of the bearing standards into binding engagement against the under side of the body bar to move the standards downwardly through said bar and cause the lower edge of the saw supporting bar 17 to securely bind upon the upper edges of the transverse ribs 21. This binding engagement of the bar with the ribs 21 securely holds the bar in position and obviates liability of rocking movement of the trunnions 15 in the standards 12 during the setting of the saw teeth. It is understood that when the washers 14 are arranged upon the lower ends of the standards, the standards may be rigidly clamped in position upon the ends of the body bar without engaging the edge of the saw supporting bar 17 with the ribs. Thus the bar 17 may be easily and quickly positioned at any desired angle between the bearing standards by means of the wing nut 19.

From the foregoing it is thought that the construction and manner of use of our improved saw vise will be fully understood. The device is particularly designed and adapted for use in sharpening or setting the teeth of cross cut saws of that character commonly employed for felling trees. The saw blade may be easily and quickly clamped between the opposed spring arms or plates mounted upon the longitudinally adjustable bar 17 and said bar readily disposed in the desired position to suit the convenience of the operator whereby the saw teeth may be filed at the proper angle and the completion of the work thus greatly facilitated. The vise may be easily and quickly anchored or rigidly mounted upon a stump or other suitable support by driving the spaced anchoring pins 7 into said support, said pins projecting to a sufficient extent beneath the body bar to cause the same to be firmly embedded in the body of the stump. As above explained, the saw carrying bar may be very rigidly clamped in a rigid position upon the body bar for the setting or swaging of the saw teeth to dispose the same at the proper angle.

The invention provides an article of the character specified which is of simple and durable construction, highly efficient in practical use and in which the various elements of construction are of simple form and may be duplicated when necessary at small cost.

While we have shown and described the preferred construction and arrangement of the various parts, it will be understood that the invention is susceptible of considerable modification within the scope of the appended claims, without departing from the essential feature or sacrificing any of the advantages thereof.

Having thus described the invention, what is claimed is:

1. The combination with a saw vise including a body bar, of anchoring pins loosely mounted in the body bar, and retaining plates for said pins secured to opposite sides of the body bar and provided with openings in which said pins have limited longitudinal movement.

2. The combination with a saw vise including a body bar, of anchoring pins loosely mounted in the body bar and adapted to be driven into a tree stump or other support said pins having annular enlargements intermediate of their ends, and stop members secured to the body bar and coacting with the enlargements to retain the pins in said bar.

3. In a device of the character described, the combination with a body bar having spaced transverse ribs on its upper surface, of bearing standards vertically movable in the ends of said bar, a saw supporting bar pivotally mounted in said standard, and means for positioning said standards in the ends of the body bar to dispose said supporting bar above said ribs, said latter means including removable elements whereby the standards may be moved in the ends of the body bar and the supporting bar rigidly engaged with said ribs.

4. In a device of the character described, the combination with a body bar, of bearing standards vertically movable in the ends of said bar, a saw supporting bar rotatably mounted in said standards, means to rigidly secure the supporting bar between the standards against pivotal movement, spaced transverse ribs seated in the upper surface of the body bar, an adjusting nut threaded upon the lower end of each of the standards and washers disposed upon said standards and on the upper surface of the body bar, said washers being adapted for removal from the standards whereby the nuts may be adjusted into engagement with the body bar and the standards moved through the ends of said bar to rigidly bind the saw supporting bar upon said transverse ribs.

In testimony whereof we hereunto affix our signatures in the presence of two witnesses.

WILLIAM SCHILDERS.
WALTER MURPHY.

Witnesses:
FERDINAND MURPHY,
MARGRETT MURPHY.

---

Copies of this patent may be obtained for five cents each, by addressing the "Commissioner of Patents, Washington, D. C."